United States Patent [19]

Tippets

[11] Patent Number: 5,784,751
[45] Date of Patent: Jul. 28, 1998

[54] HEAT ABSORBING WINDSHIELD WIPER

[76] Inventor: Clyde A. Tippets, 3046 Lampman Dr., Billings, Mont. 59102

[21] Appl. No.: 805,921

[22] Filed: Mar. 4, 1997

[51] Int. Cl.$^6$ .................................. B60S 1/46; B60S 1/52
[52] U.S. Cl. .................................. 15/250.04; 15/250.05; 15/250.06; 15/250.48; 15/250.41; 15/250.451; 239/284.1; 239/139
[58] Field of Search ................ 15/250.07, 250.08, 15/250.09, 250.04, 250.06, 250.05, 250.03, 250.48, 250.451, 250.01, 250.41; 219/202, 203; 239/284.1, 284.2, 130, 139

[56] References Cited

U.S. PATENT DOCUMENTS

| | | | |
|---|---|---|---|
| 2,234,161 | 3/1941 | Anderson et al. | 15/250.07 |
| 2,727,270 | 12/1955 | Bosso | 15/250.07 |
| 2,755,499 | 7/1956 | Mays | 15/250.06 |
| 3,418,676 | 12/1968 | Byczkowski et al. | 15/250.04 |
| 3,447,186 | 6/1969 | Senkewich | 15/250.04 |
| 3,461,477 | 8/1969 | Ikner | 15/250.06 |
| 3,523,626 | 8/1970 | Racine et al. | 15/250.07 |
| 3,574,881 | 4/1971 | Temple | 15/250.04 |
| 3,716,886 | 2/1973 | Klomp | 15/250.04 |
| 3,718,940 | 3/1973 | Bode | 15/250.06 |
| 4,145,788 | 3/1979 | Ferrarelli | 15/250.05 |
| 4,700,424 | 10/1987 | Hagen | 15/250.04 |
| 5,327,614 | 7/1994 | Egner-Walter et al. | 15/250.04 |
| 5,383,247 | 1/1995 | Nickel | 15/250.04 |
| 5,426,814 | 6/1995 | Minnick | 15/250.04 |
| 5,488,752 | 2/1996 | Randolph | 15/250.06 |

FOREIGN PATENT DOCUMENTS 6197851   7/1994   Japan ........................ 15/250.03

Primary Examiner—Gary K. Graham
Attorney, Agent, or Firm—Richard C. Conover

[57] ABSTRACT

A heated windshield wiper for keeping wiper blades free from ice. In a first embodiment, a wiper blade includes a sealed cavity containing a heat-retaining fluid which aids in keeping the wiper blade free from ice. In a second embodiment, a wiper blade includes a sealed cavity containing a heat-retaining fluid. Heated washer fluid is directed through the washer blade heating the heat-retaining fluid which aids in keeping the wiper blade free from ice.

3 Claims, 5 Drawing Sheets

HEAT ABSORBING WINDSHIELD WIPER

BACKGROUND OF THE INVENTION

This invention relates to a heated windshield wiper for keeping the wiper blade free from ice.

Several patents have illustrated heated windshield wiper blades. For instance, see U.S. Pat. No. 3,447,186, U.S. Pat. No. 3,716,886, U.S. Pat. No. 5,383,247, and U.S. Pat. No. 5,426,814. In these patents, a heated fluid, usually windshield washer fluid, is forced out to a windshield wiper blade to assist in keeping the wiper blades free from ice.

Other patents show heaters used to prevent freezing of the washing fluid. For example, see U.S. Pat. No. 4,700,424, and U.S. Pat. No. 5,327,614. These heaters are positioned in the line which delivers windshield wiper fluid to a spray nozzle which may be located in the wiper blade.

U.S. Pat. No. 5,426,814 illustrates a conventional "T" shaped retainer carried by a wiper blade. When these retainers and wiper arms are covered with ice, a problem arises because the retainer cannot slip relative to the wiper arm. Consequently, the wiper blade can no longer conform to a windshield as it moves in its sweeping motion over a curved windshield surface.

It is an object of the present invention to overcome icing problems associated with known wiper blades.

SUMMARY OF INVENTIONS

The present invention relates to a heated windshield wiper for keeping the wiper blades free from ice. In a first embodiment, a wiper blade includes a sealed cavity containing a heat retaining fluid which aids in keeping the wiper blade free from ice. In a second embodiment, a wiper blade includes a sealed cavity containing a heat retaining fluid. Heated washer fluid is directed through the washer blade heating the heat retaining fluid which aids in keeping the wiper blade free from ice.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF THE PREFERRED EMBODIMENTS

Figure 1:
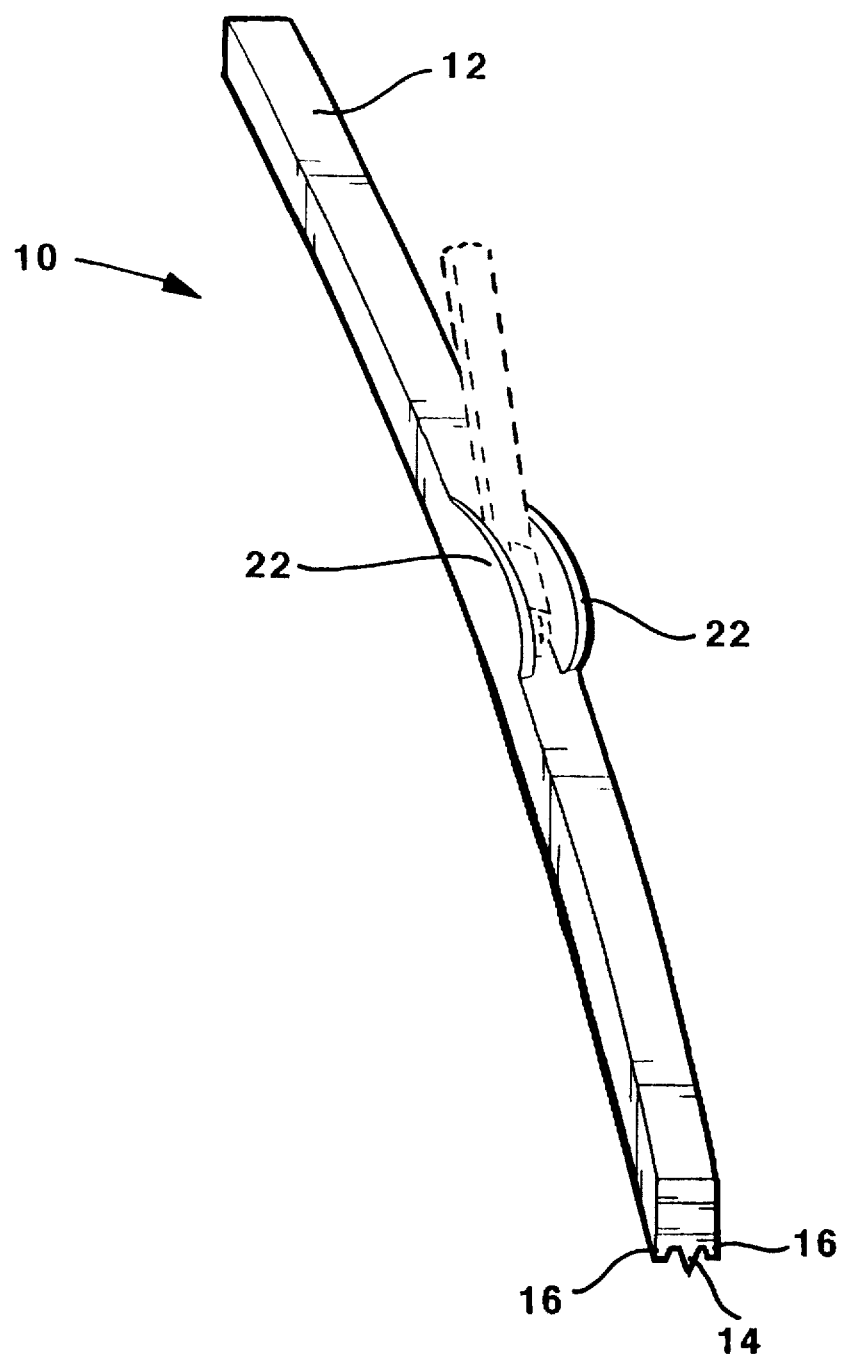
FIG. 1 is a perspective view of a wiper blade according to the present invention.
Figure 2:
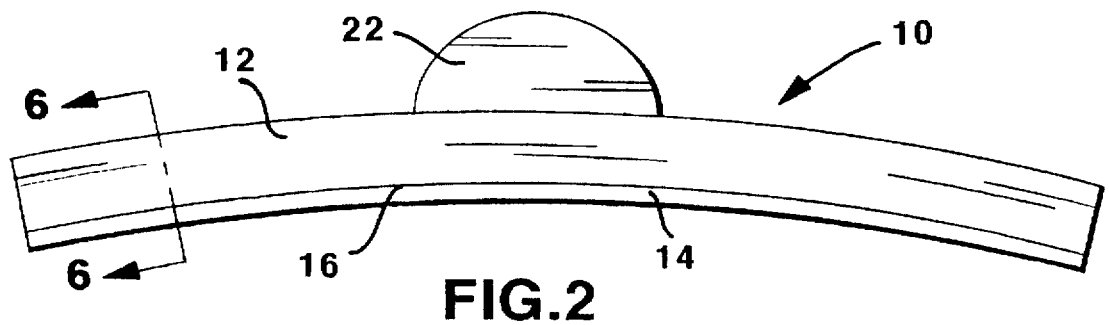
FIG. 2 is an elevational view of the wiper blade shown in FIG. 1.
Figure 3:
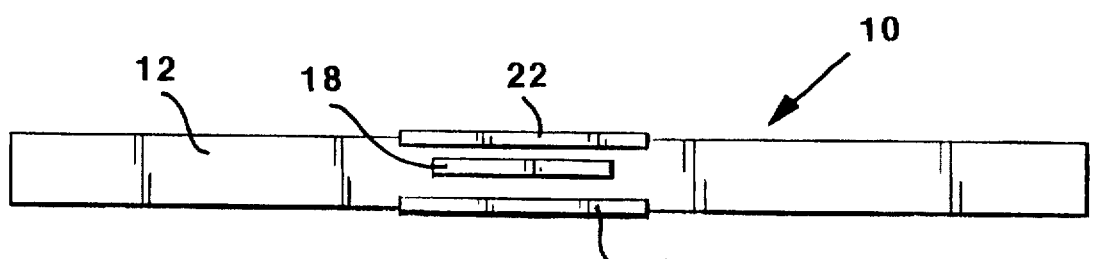
FIG. 3 is a plan view of the wiper blade shown in FIG. 2.

A preferred embodiment of a heat absorbing windshield wiper 10 is shown in FIG. 1. Heat absorbing windshield wiper 10 has a hollow elongate body 12, made of rubber in the preferred embodiment. A flexible wiper blade 14 is attached to body 12 and runs the entire length of body 12. On either side of blade 14, as shown in FIGS. 2 and 4, stiffening boundary lips 16 extend along body 12 on opposite sides of the blade to conform the blade to a windshield as the wiper moves across a curved windshield.

Figure 4:
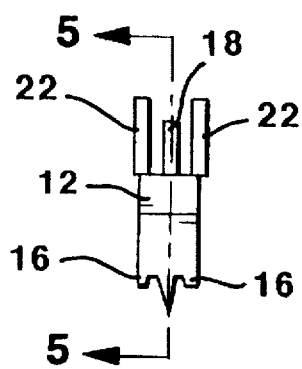
FIG. 4 is a right end view of the wiper blade shown in FIG. 2.
Figure 5:
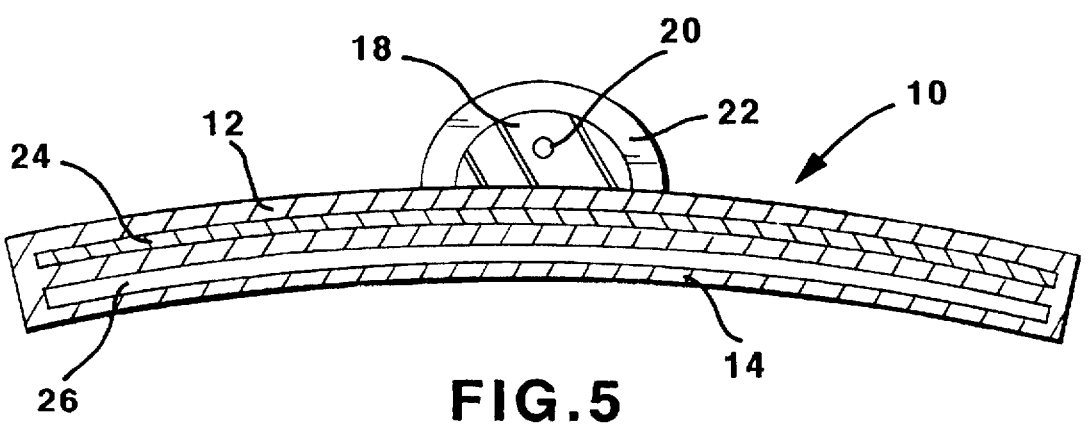
FIG. 5 is a cross-sectional view of the wiper blade shown in FIG. 2, but taken along the line 5—5 in FIG. 4.
Figure 7:
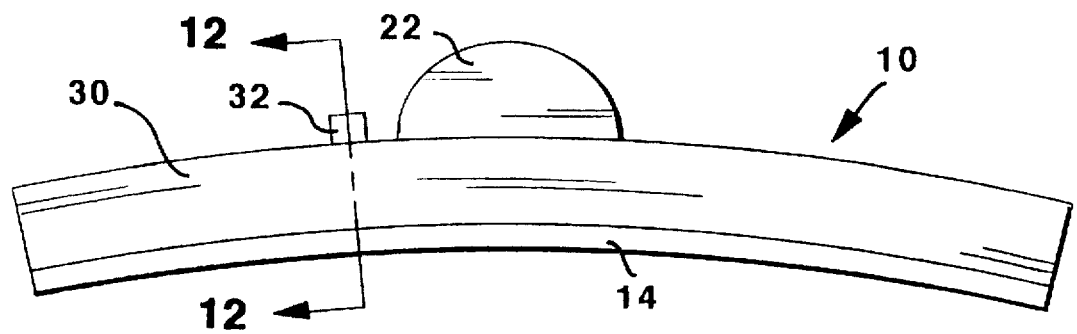
FIG. 7 is an elevational view of a second embodiment of a wiper blade.
Figure 8:
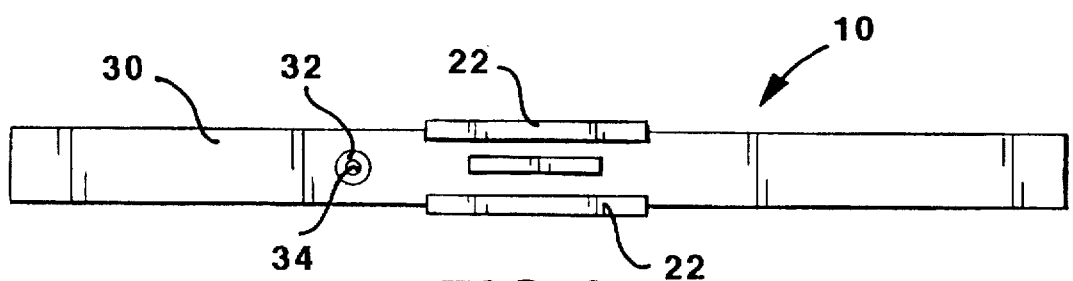
FIG. 8 is a plan view of the wiper blade shown in FIG. 7.

On the side of body 12 opposite blade 14, as best seen in FIGS. 4 and 5, a stiff, upright flange 18 extends away from the body and is used to fasten the wiper blade of the present invention to a conventional wiper arm on a vehicle. Flange 18 has a hole 20 through it so that a pin (not shown) can extend through the hole to pin flange 18 to a conventional, vehicle wiper arm. The pin and hole 20 are sized so that flange 18 can be rotated relative to the vehicle wiper arm. It can be appreciated that other conventional pivotal connections could be used equally as well in place of flange 18 to connect heat absorbing windshield wipers 10 to other, specific-vehicle, windshield wiper arms.

Flexible, protective boots 22 are provided on either side of flange 18 to prevent ice and snow from interfering with the rotational movement of flange 18 with respect to the vehicle wiper arm, and also to prevent the retaining pin from falling out of hole 20. Boots 22 are flexible enough to allow the pin to be inserted into, or removed from, hole 20 by flexibly bending a boot out of the way.

Figure 6:
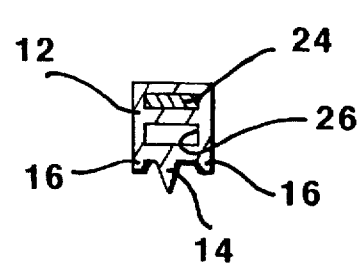
FIG. 6 is a cross-sectional view of the wiper blade taken along the line 6—6 in FIG. 2.

As best seen in FIGS. 5 and 6, the interior of hollow body 12 has an elongated, springy, spline 24 that is embedded in body 12 and extends most of the length of the body. Springy, spline 24 is formed with a rest position having a slight curvature so that the spline can be positioned within body 12 with its ends curving away from flange 18. As a wiper arm spring pushes the center portion of windshield wiper 10 toward a windshield, the springy force of spline 24 forces the ends of body 12 against the windshield throughout the oscillating travel of the windshield wiper blade.

The interior of body 12 also includes a closed cavity 26, as seen in FIGS. 5 and 6, which cavity is filled with a heat-retaining fluid 28. In a preferred embodiment, heat retaining fluid 28 has a tradename of NORKOOL #224c or N507, and is manufactured by the Union Carbide Co, although other heat retaining fluids could be used equally as well.

In operation, an old wiper blade is removed from a vehicle at the pivotal connection between the wiper arm and the wiper. The old wiper is then replaced with a heat absorbing windshield wiper 10. Heat from the engine compartment, or heat flowing through the windshield, provides ambient heat to warm heat retaining fluid 28 even when the wiper is in a rest position. Then as the windshield wiper is used, this heat stored in heat retaining fluid 28 will slowly flow from cavity 26 through body 12 to assist in melting ice or snow on the wiper, wiper blade, or vehicle windshield. Spline 24 acts to conform body 12 and blade 14 to the surface of a windshield whenever the windshield wiper arm is oscillating.

A second embodiment of a heat absorbing windshield wiper 10 is shown in FIGS. 7-13. In the second embodiment, heat absorbing windshield wiper 10 has an elongate body 30, that also has a flexible blade 14 and stiffening, boundary lips 16 running the length of the body on the side of the body facing the windshield of a vehicle. In the second embodiment, blade 14 and stiffening boundary lips 16 function the same as in the first embodiment. Also flange 18 and protective boots 22 are positioned and function the same as in the first embodiment.

Figure 10:
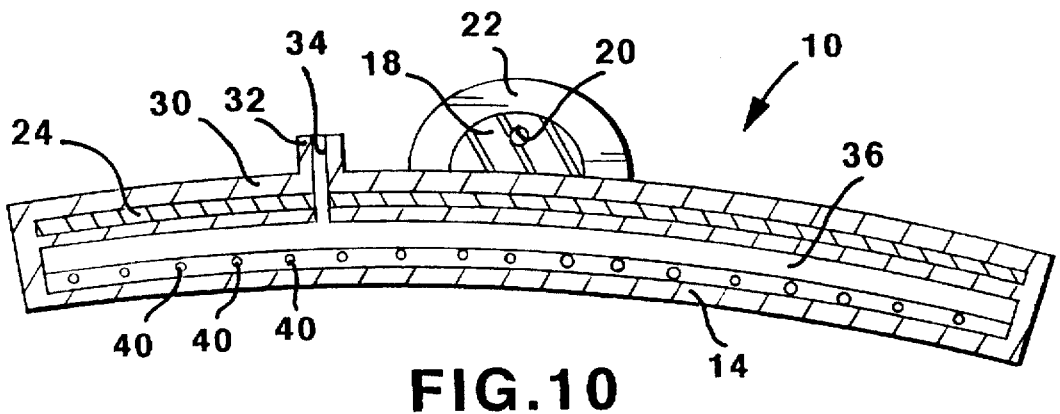
FIG. 10 is a cross-sectional view of the wiper blade shown in FIG. 7, but taken along the line 10—10 in FIG. 9.
Figure 11:
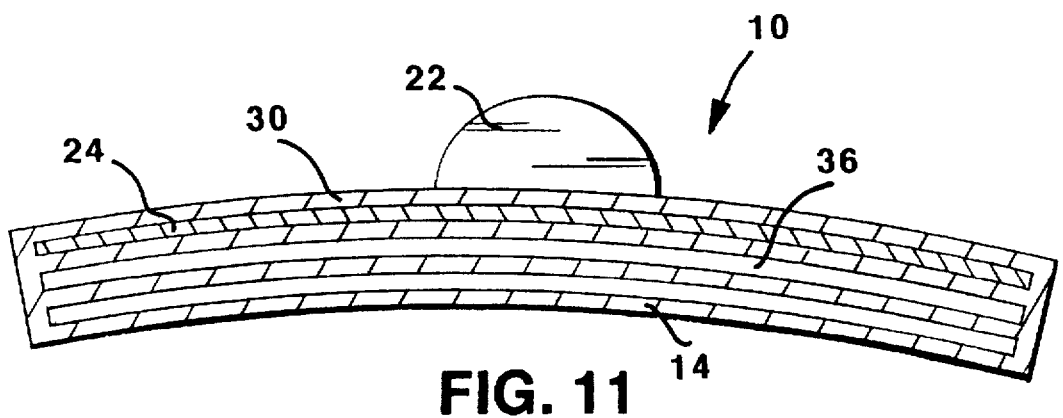
FIG. 11 is a cross-sectional view of the wiper blade taken along the line 11—11 in FIG. 9.
Figure 9:
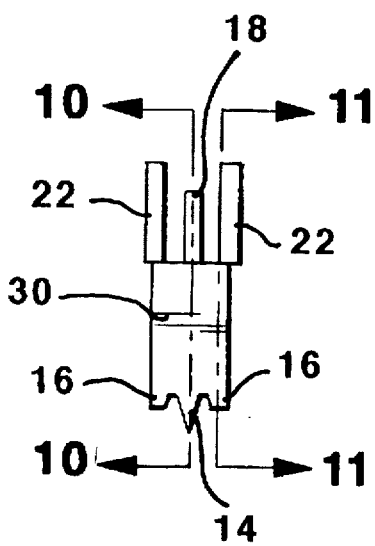
FIG. 9 is a right end view of the wiper blade shown in FIG. 7.
Figure 12:
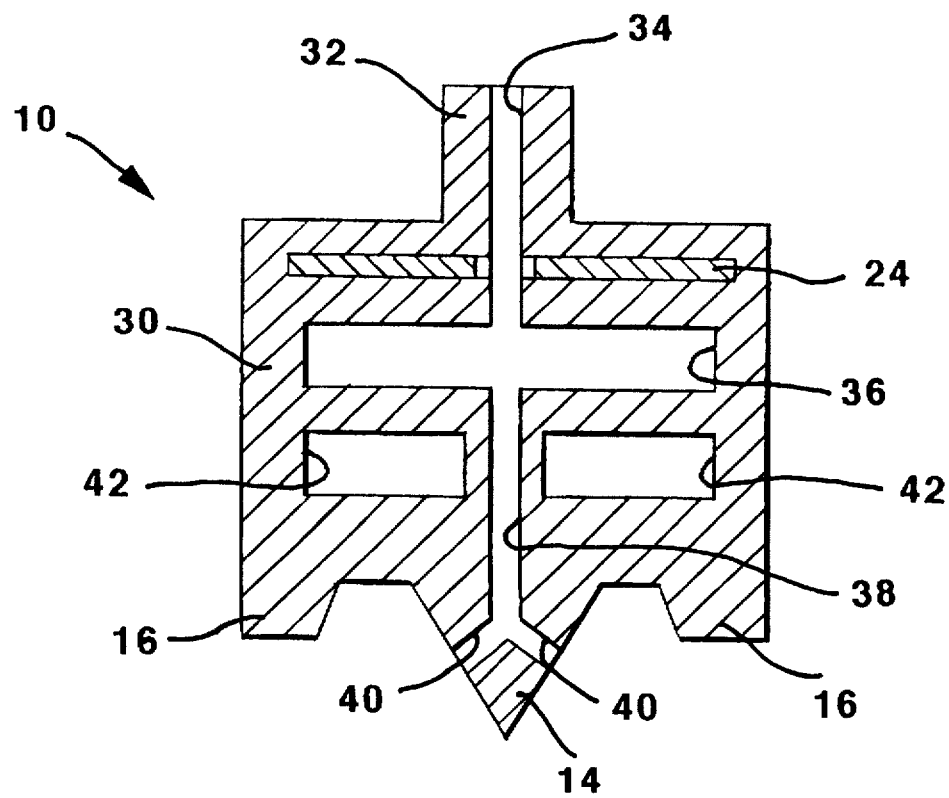
FIG. 12 is an enlarged cross-sectional view of the wiper blade taken along the line 12—12 in FIG. 7.

As best seen in FIGS. 10–12, body 30 again has a springy spline 24 that is embedded in body 30 and extends most of the length of the body. Springy, spline 24 also functions in the same manner as in the first embodiment.

Differently than in the first embodiment, body 30 has a boss 32 extending away from the body on the same side as flange 18. As best seen in FIG. 12, boss 32 has a bore 34 that extends through the boss, with the bore extending on through body 30, spline 24, and into cavity 36 so that the cavity is in fluid communication with the top of boss 32. Cavity 36 also has a portion 38 which extends from the cavity toward blade 14. Adjacent blade 14, passageways 40 extend from the inside of cavity 36 to the outside of the blade to provide a passageway for fluid to move from the cavity out onto a windshield. In addition as best seen in FIGS. 11 and 12, body 30 has a pair of closed cavities 42 which are again filled with a heat retaining fluid such as that identified in the first embodiment with the tradename of NORKOOL #224c or N507, as manufactured by the Union Carbide Co.

Figure 13:
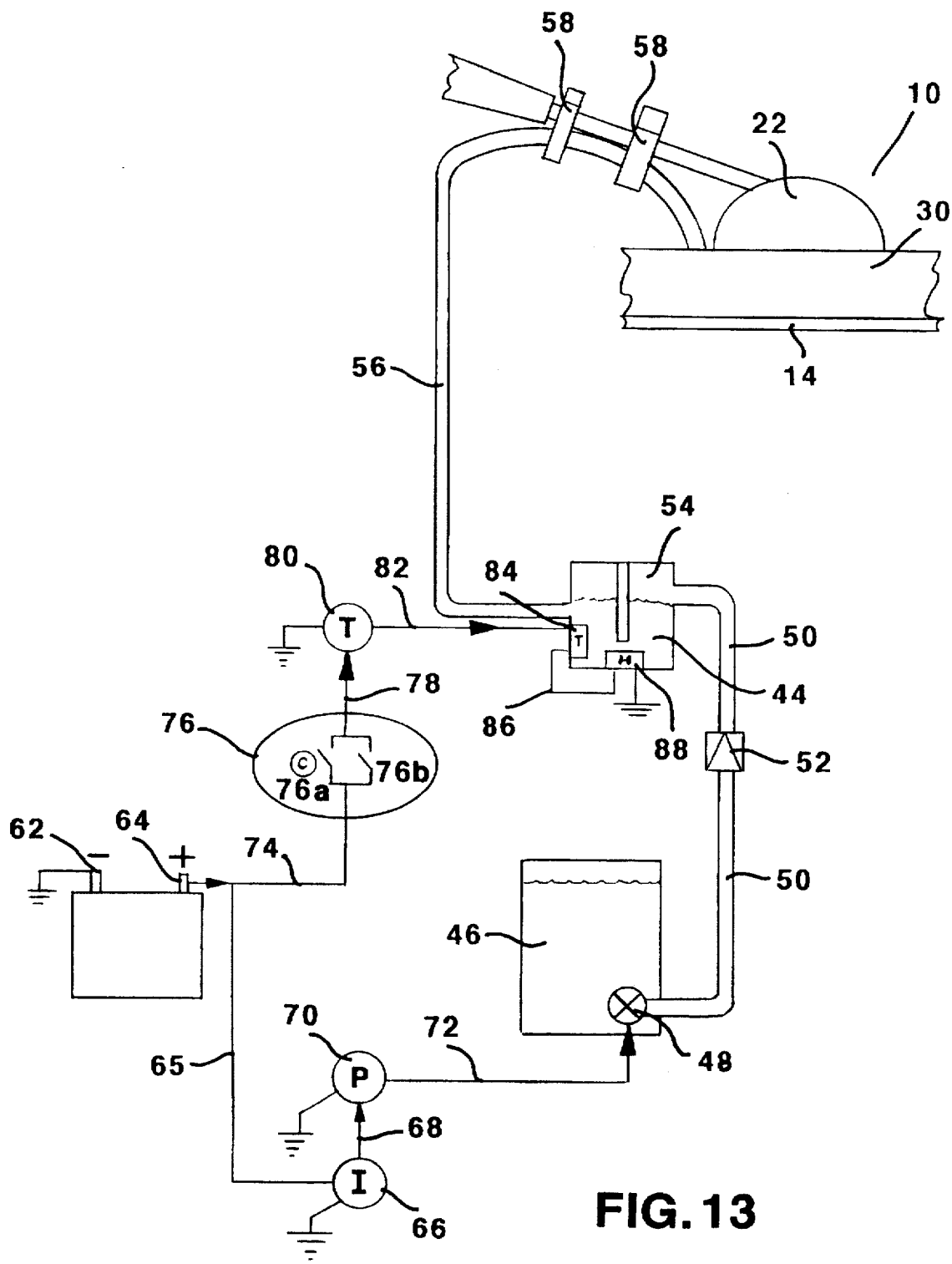
FIG. 13 is an electro-mechanical schematic of a system for operating the second embodiment shown in FIG. 7.

As can best be seen by looking at FIG. 13, washer fluid 44 can be held, and heated, as it is forced toward body 30. Under "no-use" conditions, washer fluid 44 is normally held in a container 46. Then as desired, washer fluid 44 is moved by the action of pump 48, through hose 50, through check valve 52, to a heater container 54. A hose 56, fluidly connects heater container 54 with body 30, is slipped over boss 32 to provide a conduit for washer fluid to enter body 30 of the wiper. Hose 56 is held against the windshield wiper arm on a vehicle by a band or clip 58.

Pump 48 pumps washer fluid 44 from container 46 into heater container 54, and then through hose 56 to bore 34 in boss 32. Washer fluid 44 then passes along bore 34 to enter cavity 36. After warm washer fluid 44 has entered and accumulated in cavity 36, the warm washer fluid moves through portion 38 and then through passageways 40 to the outside of blade 14.

A simple electrical circuit is used to control the flow and heating of washer fluid 44. As seen in FIG. 13, a conventional auto battery has a grounded negative terminal 62 and a positive terminal 64. A lead 65 electrically connects the positive terminal 64 with the vehicle ignition switch 66. From the other side of ignition switch 66, a lead 68 electrically connects ignition switch 66 with a pump switch 70. Pump switch 70 is a single-pole, single-throw switch where the throw can be manually operated to open or close the switch. From the other side of pump switch 70, a lead 72 electrically connects pump 48 with pump switch 70. Pump switch 70 can then be activated manually to pump washer fluid 44 whenever the vehicle ignition switch 66 is on.

A lead 74 electrically connects positive terminal 64 with a clock/override switch 76. Clock/override switch 76 has two internal switches. The first internal switch 76a is a single-pole, single-throw switch wherein the throw is operated electrically by an electrical clock. The electrical clock is used to specify a start time and duration for closing the throw. The second internal switch 76b is connected in parallel with the first switch 76a. The second switch 76b is also a single-pole, single-throw switch. The throw of this switch is operated manually whenever desired. With this internal circuit layout, whenever the second internal switch 76b is closed, power will flow through clock/override switch 76 no matter what the setting of the clock-operated, first internal switch 76a. The override feature of clock/override switch 76a may be used at any time, since it is wired in parallel with the clock switch, to manually bypass first internal switch 76a.

A lead 78 electrically connects clock/override switch 76 with a first thermostat 80. First thermostat 80 closes whenever the outside temperature falls below an adjustable set temperature value within the thermostat and opens whenever the temperature rises above the set value.

A lead 82 electrically connects first thermostat 80 with second thermostat 84. Second thermostat 84 closes whenever the temperature of washer fluid 44 held in heater container 54 falls below a set value built into the second thermostat. A lead 86 provides electrical power to heater 88 which is located at the bottom of heater container 54. Lead 86 carries power whenever first and second thermostat 80 and 84 are closed. Heater 88 is used to heat washer fluid 44.

In operation, heat absorbing windshield wiper 10 is mounted on a wiper arm using the second embodiment wiper. Hose 56 is led from heater container 54 and inserted over boss 32 and fastened to the wiper arm by bands or clips 58.

Power is supplied to manual pump switch 70 whenever ignition switch 66 is closed. When manual pump switch 70 is manually closed, pump 48 pumps washer fluid 44 from container 46, through heater container 54, and then on towards blade 14. When pump switch 70 is manually opened, pump 48 continues pumping washer fluid 44.

The heater circuit for washer fluid 44 is controlled independently of ignition switch 66. Switch 76a is used to provide power to first thermostat 80 whenever an electrical clock closes the throw of internal clock switch 76a. The switch 76a is then kept closed for a time equal to the duration of the setting of the clock. Second internal override switch 76b may be closed at any time to override internal clock switch 76a and provide power to first thermostat 80.

If the outside temperature falls below the adjustable temperature setting of first thermostat 80, an electrical signal is directed to second thermostat 84 through lead 82. If the outside temperature is above the setting, first thermostat will open the circuit to second thermostat 84. The adjustable temperature setting allows an operator to isolate the heater circuit, during the summer for instance, and only allow power to heater 88 during cool temperatures such as during the winter.

As the temperature of washer fluid 44 falls below the second thermostat 84 setting, the second thermostat closes to provide power to heater 88 whenever thermostat switch 80 is closed. Heater 88 then heats washer fluid 44, before the washer fluid is pumped out through hose 56 toward the wiper blade. When washer fluid 44 is pumped, the washer fluid in hose 56 is forced into cavity 36 where it further warms heat retaining fluid 28 in body 30. As warm washer fluid 44 continues to be pumped into cavity 36, the fluid moves through portion 38, and then through passageways 40 out onto the windshield.

As the heated washer fluid 44 flows into body 30, heat retaining fluid 28, in closed cavities 42, will absorb heat coming from the heated washer fluid, from the engine compartment, through the windshield. When desired, additional washer fluid can be pumped through hose 50 to heater container 54 by manually activating pump switch 48. The additional washer fluid is then heated in heater container 54 (if both first and second thermostats 80 and 84 are closed)

before being forced through hose 56 toward wiper body 30. While the fundamental novel features of the invention have n shown and described, it should be understood that various substitutions, modifications and variations may be made by those skilled in the art without departing from the spirit or scope of invention. Accordingly, all such modifications or variations are included in the scope of the invention as defined the following claims.

I claim:

1. A heat absorbing windshield wiper including structure for spraying windshield washer fluid onto a curved windshield:

an elongate body having a first and second internal cavity;

the first cavity having a bore fluidly connecting the first cavity with an exterior surface of the elongate body;

the first cavity further having a passageway fluidly connecting the first cavity with a nozzle located on an extension surface of the elongate body adjacent the windshield;

the second internal cavity being closed;

a spline embedded in and extending along the elongate body to shape the elongate body to rest against the curved windshield;

a pumping means for pumping washer fluid into the first cavity through the bore, and then from the first cavity, onto the windshield through the passageway;

a heating means for heating the washer fluid;

a heat retaining fluid continuously trapped in the second internal cavity; and a fastening means for fastening the heat absorbing windshield wiper to a conventional vehicle wiper arm.

2. A windshield wiping system comprising:

an elongate body having a first and second internal cavity;

the first cavity having a bore fluidly connecting the first cavity with an exterior surface of the elongate body;

the first cavity further having a passageway fluidly connecting the first cavity with a nozzle located on an extension surface of the elongate body adjacent the windshield;

the second internal cavity being closed;

a spline embedded in and extending along the elongate body to shape the elongate body to rest against the curved windshield;

a pumping means for pumping washer fluid into the first cavity through the bore, and then from the first cavity, onto the windshield through the passageway;

a heating means for heating the washer fluid;

a heat retaining fluid continuously trapped in the second internal cavity;

a fastening means for fastening the heat absorbing windshield wiper to a conventional vehicle wiper arm;

a washer fluid container containing washer fluid;

a heater container having a heater;

a first hose connecting the washer fluid container and the heater container;

a second hose connecting the heater container and the heat absorbing windshield wiper;

a pump for pumping washer fluid from the washer fluid container through the first hose to the heater container, and thence from the heater container through the second hose to the heat absorbing windshield wiper; and an adjusting means for adjusting the temperature of the windshield wiper fluid in the heater container.

3. A windshield wiping system according to claim 2 wherein the adjusting means further includes:

an electrical supply providing power to the heater through an electrical supply line; and a thermostat switch located in the electrical supply line which closes whenever the washer fluid temperature falls below a set temperature and opens whenever the washer fluid temperature rises above the set temperature.

* * * * *